(12) United States Patent  
Li et al.

(10) Patent No.: US 9,317,768 B2  
(45) Date of Patent: Apr. 19, 2016

(54) TECHNIQUES FOR IMPROVED FEATURE DETECTION

(71) Applicant: Intel Corporation, Santa Clara, CA (US)

(72) Inventors: Qiang Li, Beijing (CN); Bin Wang, Beijing (CN); Liu Yang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 121 days.

(21) Appl. No.: 13/625,962

(22) Filed: Sep. 25, 2012

(65) Prior Publication Data

US 2014/0086490 A1    Mar. 27, 2014

(51) Int. Cl.  
*G06K 9/46* (2006.01)

(52) U.S. Cl.  
CPC ........................................ *G06K 9/46* (2013.01)

(58) Field of Classification Search  
None  
See application file for complete search history.

(56) References Cited

U.S. PATENT DOCUMENTS

| 7,315,631 | B1* | 1/2008 | Corcoran et al. | 382/118 |
| 2007/0217688 | A1* | 9/2007 | Sabe et al. | 382/226 |
| 2012/0020514 | A1* | 1/2012 | Sawai | 382/103 |

OTHER PUBLICATIONS

Yang et al, "AdaBoost-based face detection for embedded systems," 2010, Computer Vision and Image Understanding 114 (2010), pp. 1116-1125.*  
P. Viola, M. Jones—"Rapid Object Detection Using a Boosted Cascade of Simple Features," Accepted Conference on Computer Vision and Pattern Recognition, 2001.  
N. Dalal, B. Triggs—"Histograms of Oriented Gradients for Human Detection," Accepted Conference on Computer Vision and Pattern Recognition, 2005.

* cited by examiner

*Primary Examiner* — David F Dunphy  
(74) *Attorney, Agent, or Firm* — Kacvinsky Daisak Bluni PLLC

(57) ABSTRACT

Techniques for improved feature detection are described. In one embodiment, for example, a device may include a processor circuit and a feature detection module, and the feature detection module may be operative on the processor circuit to perform a first feature detection iteration for a graphics information element using an integral pixel value array, determine a scaling factor, recalculate the integral pixel value array based on the scaling factor, and perform a second feature detection iteration for the graphics information element using the recalculated integral pixel value array. Other embodiments are described and claimed.

27 Claims, 10 Drawing Sheets

FIG. 3A

| | 304 | | | |
|---|---|---|---|---|
| | 304-1-1 3 | 304-1-2 2 | 304-1-3 1 | 304-1-4 0 |
| | 304-2-1 2 | 304-2-2 2 | 304-2-3 1 | 304-2-4 0 |
| | 304-3-1 1 | 304-3-2 1 | 304-3-3 1 | 304-3-4 0 |
| | 304-4-1 0 | 304-4-2 0 | 304-4-3 0 | 304-4-4 0 |

| | 306 | | | |
|---|---|---|---|---|
| | 306-1-1 3 | 306-1-2 5 | 306-1-3 6 | 306-1-4 6 |
| | 306-2-1 5 | 306-2-2 9 | 306-2-3 11 | 306-2-4 11 |
| | 306-3-1 6 | 306-3-2 11 | 306-3-3 14 | 306-3-4 14 |
| | 306-4-1 6 | 306-4-2 11 | 306-4-3 14 | 306-4-4 14 |

FIG. 3B

| | 314 | | | |
|---|---|---|---|---|
| | 314-1-1 {3, 0} | 314-1-2 {2, 1} | 314-1-3 {1, 3} | 314-1-4 {0, 6} |
| | 314-2-1 {2, 2} | 314-2-2 {2, 0} | 314-2-3 {1, 2} | 314-2-4 {0, 5} |
| | 314-3-1 {1, 2} | 314-3-2 {1, 4} | 314-3-3 {1, 0} | 314-3-4 {0, 3} |
| | 314-4-1 {0, 5} | 314-4-2 {0, 3} | 314-4-3 {0, 1} | 314-4-4 {0, 0} |

| | 316 | | | |
|---|---|---|---|---|
| | 316-1-1 {3, 0} | 316-1-2 {5, 1} | 316-1-3 {6, 4} | 316-1-4 {6, 10} |
| | 316-2-1 {5, 2} | 316-2-2 {9, 3} | 316-2-3 {11, 8} | 316-2-4 {11, 19} |
| | 316-3-1 {6, 4} | 316-3-2 {11, 9} | 316-3-3 {14, 14} | 316-3-4 {14, 28} |
| | 316-4-1 {6, 9} | 316-4-2 {11, 17} | 316-4-3 {14, 23} | 316-4-4 {14, 37} |

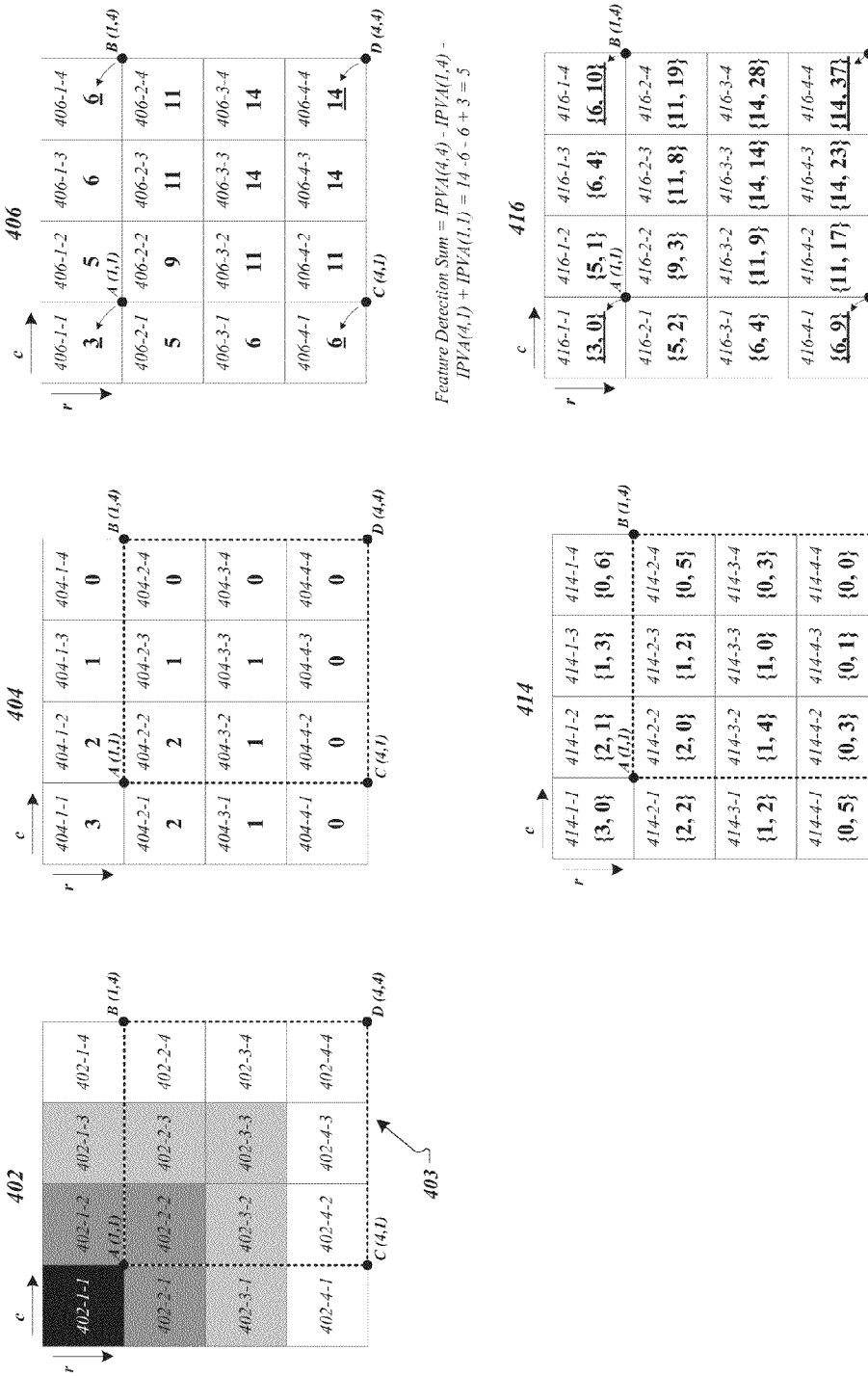

*PRIOR ART*

TECHNIQUES FOR IMPROVED FEATURE DETECTION

BACKGROUND

Feature detection in images, videos, and/or other graphics information elements may be useful in a wide variety of contexts, to detect features such as faces, persons, objects, landmarks, landscape features, optical effects, and/or other visual features. Conventional techniques for feature detection may utilize an integral image algorithm implemented using an integral pixel value array to facilitate the feature detection process. According to such conventional techniques, use of such an integral image algorithm may include repeatedly downscaling a graphics information element and recomputing the integral pixel value array following each downscaling operation. However, the computational cost associated with performing such downscaling operations on the graphics information element to be analyzed may be significant, resulting in reduced efficiency and speed. As such, techniques for employing an integral image process without requiring repeated downscaling of the graphics information element may be desirable.

BRIEF DESCRIPTION OF THE DRAWINGS

FIG. 3A illustrates one embodiment of an integral pixel value array.

FIG. 3B illustrates a second embodiment of an integral pixel value array.

FIG. 4 illustrates a first embodiment of a feature detection calculation and a second embodiment of a feature detection calculation.

DETAILED DESCRIPTION

Various embodiments may be generally directed to techniques for improved feature detection. In one embodiment, for example, a device may include a processor circuit and a feature detection module, and the feature detection module may be operative on the processor circuit to perform a first feature detection iteration for a graphics information element using an integral pixel value array, determine a scaling factor, recalculate the integral pixel value array based on the scaling factor, and perform a second feature detection iteration for the graphics information element using the recalculated integral pixel value array. Other embodiments may be described and claimed.

Various embodiments may include one or more elements. An element may constitute any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
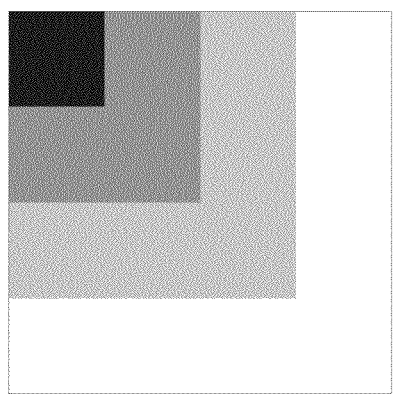
FIG. 1 illustrates one embodiment of a graphics information element.

FIG. 1 illustrates one embodiment of a graphics information element 100, such as one on which feature detection might be performed in various embodiments. A graphics information element may constitute an image, video frame, diagram, picture, pattern, icon, or other element of graphics information, and may be made up of an arrangement of one or more pixels. As shown in FIG. 1, graphics information element 100 is representable as pixel arrangement 102. A pixel arrangement that represents a graphics information element may include one or more dimensions, which may be indexed by one or more reference coordinates. In the example of FIG. 1, pixel arrangement 102 constitutes a two-dimensional pixel arrangement, where a coordinate system including an r coordinate and a c coordinate is employed with an origin at the top left of the pixel arrangement, and where individual pixels 102-r-c are identified by an r index value and a c index value. For example, pixel 102-1-1 constitutes a pixel with index values r=1 and c=1. It is worthy of note that although a two-dimensional pixel arrangement and coordinate system is shown for ease of illustration, pixel arrangements and coordinate systems with lower or higher numbers of dimensions are both possible and contemplated. The embodiments are not limited in this context.

Also shown in FIG. 1 is pixel value array 104. A pixel value array may constitute an array of values that describe properties of the pixels in a pixel arrangement. A pixel value array corresponding to a graphics information element may be an array of pixel values describing properties of the pixels in a pixel arrangement making up that graphics information element. In the example of FIG. 1, pixel value array 104 may correspond to graphics information element 100, and may contain pixel values describing properties of the pixels in pixel arrangement 102. Properties described by the pixel values in a pixel value array may include, for example, brightness, hue, contrast, saturation, transparency, and/or other visual properties. For example, element 104-1-1 in pixel value array 104 contains a pixel value of 3, and this pixel value may indicate that a brightness of pixel 102-1-1 in pixel arrangement 102 is equal to 3. The embodiments are not limited to this example.

Also shown in FIG. 1 is a multi-dimensional pixel value array 106. A multi-dimensional pixel value array may constitute a pixel value array that contains multiple pixel values for each pixel in the pixel arrangement to which it corresponds. The multiple pixel values may describe multiple properties of the corresponding pixels in the pixel arrangement. In the example of FIG. 1, multi-dimensional pixel value array 106 contains two pixel values for each pixel in pixel arrangement 102. Element 106-1-1 in multi-dimensional pixel value array 106 contains the pixel value pair {3, 0}, which may indicate, in an example, that a brightness of pixel 102-1-1 in pixel arrangement 102 is equal to 3 and that a contrast of pixel 102-1-1 is equal to 0. The embodiments are not limited to this example.

Figure 2:
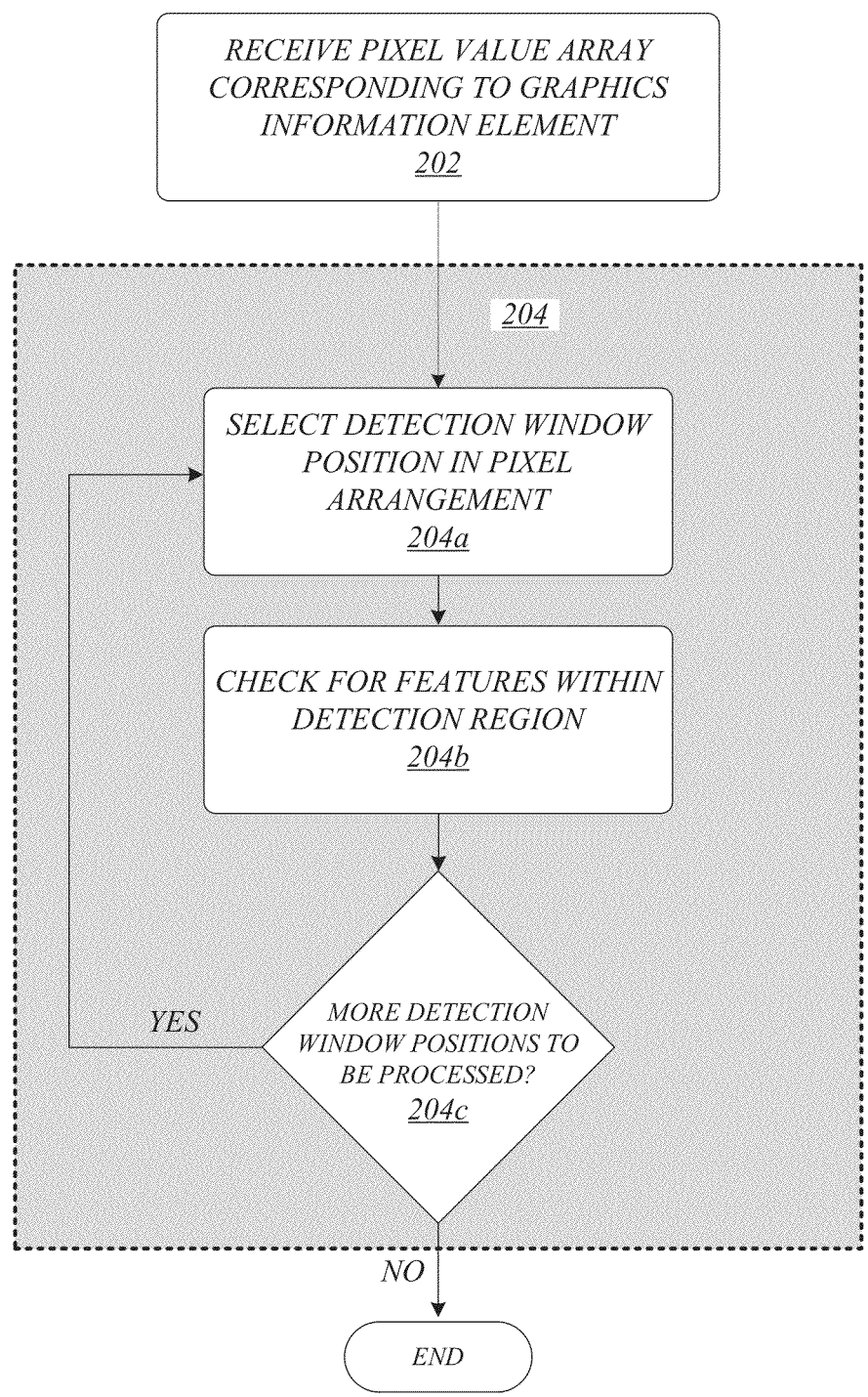
FIG. 2 illustrates one embodiment of a first logic flow.

In a variety of contexts, it may be desirable to perform feature detection to detect features within a graphics information element such as, for example, graphics information element 100 of FIG. 1. FIG. 2 illustrates one embodiment of a feature detection logic flow such as might be employed as part of such feature detection. As shown in FIG. 2, a pixel value array corresponding to a graphics information element may be received at 202. At 204, an iterative process may begin in which—during each iteration—a detection window position is selected and a check is performed for the existence of features within the pixels of the pixel arrangement that reside within the detection window at the selected position. The pixels of the pixel arrangement that reside within the detection window at a particular time may be referred to as the detection region. The features for which a check is performed may include faces, persons, objects, landmarks, landscape features, optical effects, and/or other visual features. The embodiments are not limited to these examples.

The iterative process 204 may begin at 204a, where a detection window position may be selected. The detection window position may constitute a reference location among the pixels of the pixel arrangement, the selection of which determines the detection region. At 204b, a check may be performed to determine whether features are present within the detection region. At 204c, it may be determined whether there are more detection window positions to be processed. If it is determined that there are more detection window positions to be processed, flow may return to 204a, where a new detection window position may be selected from among those remaining to be processed. If it is determined that there are no more detection window positions to be processed, iterative process 204—and feature detection logic flow 200—may end.

In various claimed embodiments as well as conventional techniques, determining whether features are present within a detection region of a pixel arrangement—such as according to operation 204b in logic flow 200 of FIG. 2—may involve performing calculations based on pixel values in a pixel value array such as pixel value array 104 of FIG. 1. More particularly, in some claimed embodiments and conventional techniques, an integral pixel value array may be computed based on a pixel value array, and one or more feature detection sums may be calculated based on values in the integral pixel value array that correspond to a detection region of a pixel arrangement to which the pixel value array and the integral pixel value array correspond.

FIG. 3A illustrates one embodiment of an integral pixel value array 306 corresponding to a pixel value array 304. Each element of an integral pixel value array may contain one or more integral pixel values. For example, element 306-2-2 in integral pixel value array 306 contains the integral pixel value 9. The integral pixel value in each element 306-r-c in integral pixel value array 306 may constitute a sum of the pixel values in pixel value array 304 that reside within the rectangular region defined by the origin and the element 304-r-c in pixel value array 304. For example, element 306-2-2—also expressible as IPVA(2,2)—in integral pixel value array 306 corresponds to the coordinate indices r=2, c=2. As such, element 306-2-2 may contain a sum of the pixel values located in the elements of pixel value array 304 that reside within the rectangular region defined by the origin and element 304-2-2. These elements are shaded, and include elements 304-1-1, 304-1-2, 304-2-1, and 304-2-2, which contain the pixel values 3, 2, 2, and 2, respectively. The sum of the pixel values 3, 2, 2, and 2 is 9, and therefore element 306-2-2 in integral pixel value array 306 contains the integral pixel value 9.

FIG. 3B illustrates one embodiment of an integral pixel value array 316 corresponding to a multi-dimensional pixel value array 314. Each element of an integral pixel value array that corresponds to a multi-dimensional pixel value array may contain a set of integral pixel values, each integral pixel value in the set corresponding to pixel values that describe a respective property of the pixels in a pixel arrangement. For example, element 316-2-3—also expressible as $IPVA_{i,j}(2, 3)$—in integral pixel value array 316 corresponds to the coordinate indices r=2, c=3. As such, where each element 314-r-c in pixel value array 314 contains a set of pixel values of the form {i,j}, element 316-2-3 may contain an integral pixel value I constituting a sum of the i pixel values located in the elements of pixel value array 314 that reside within the rectangular region defined by the origin and element 314-2-3, and an integral pixel value J constituting a sum of the j pixel values located in those elements of pixel value array 314. These elements are shaded in FIG. 3B, and include elements 314-1-1, 314-1-2, 314-1-3, 314-2-1, 314-2-2, and 314-2-3. The i values contained in these elements of pixel value array 314 are 3, 2, 1, 2, 2, and 1, respectively. The sum of these i values is 14, and therefore element 316-2-3 in integral pixel value array 316 contains an integral pixel value I of 14. The j values contained in these elements of pixel value array 314 are 0, 1, 3, 2, 0, and 2, respectively. The sum of these j values is 8, and therefore element 316-2-3 in integral pixel value array 316 contains an integral pixel value J of 8. The embodiments are not limited to these examples.

FIG. 4 illustrates a first embodiment of a feature detection calculation and a second embodiment of a feature detection calculation. As shown in FIG. 4, a pixel arrangement 402 includes pixels 402-r-c. A feature detection window with vertices A, B, C, and D is positioned such that it defines a detection region including the pixels 402-2-2, 402-2-3, 402-2-4, 402-3-2, 402-3-3, 402-3-4, 402-4-2, 402-4-3, and 402-4-4. A pixel value array 404 corresponds to pixel arrangement 402, and contains elements 404-r-c. An integral pixel value array 406 corresponds to pixel arrangement 402 and pixel value array 404. A feature detection sum FDS corresponding to detection region 403 in pixel arrangement 402 may constitute a sum of the pixel values in elements 404-2-2, 404-2-3, 404-2-4, 404-3-2, 404-3-3, 404-3-4, 404-4-2, 404-4-3, and 404-4-4 of pixel value array 404. However, rather than requiring the direct summation of these nine values, such a feature detection sum FDS may be calculated using simply the four integral pixel values in the four elements of integral pixel value array that correspond to the coordinates of points A, B, C, and D. More particularly, such a feature detection sum may be calculated according to the equation $FDS=IPVA(r_D, c_D)-IPVA(r_B, c_B)-IPVA(r_C, c_C)+IPVA(r_A, c_A)$. In the example of FIG. 4, the integral pixel values that correspond to points A, B, C, and D are contained in elements 406-1-1, 406-1-4, 406-4-1, and 406-4-4 respectively, and have values of 3, 6, 6, and 14, respectively. As such, a feature detection sum corresponding to detection region 403 in pixel arrangement 402 may be calculated according to the equation FDS=14−6−6+3=5. The embodiments are not limited to this example.

Pixel value array 414 also corresponds to pixel arrangement 402, and contains elements 414-r-c, each of which contains a pixel value pair in the form {i,j}. An integral pixel value array 416 corresponds to pixel arrangement 402 and pixel value array 414. A feature detection sum $FDS_I$ corresponding to detection region 403 in pixel arrangement 402 may constitute a sum of the i pixel values in elements 414-2-2, 414-2-3, 414-2-4, 414-3-2, 414-3-3, 414-3-4, 414-4-2, 414-4-3, and 414-4-4 of pixel value array 414, and a feature detection sum $FDS_J$ corresponding to detection region 403 in pixel arrangement 402 may constitute a sum of the j pixel values in elements 414-2-2, 414-2-3, 414-2-4, 414-3-2, 414-3-3, 414-3-4, 414-4-2, 414-4-3, and 414-4-4 of pixel value array 414. Such feature detection sums may be calculated according to the equations $FDS_I = IPVA_f(r_D, c_D) - IPVA_f(r_B, c_B) - IPVA_f(r_C, c_C) + IPVA_f(r_A, c_A)$ and $FDS_J = IPVA_f(r_D, c_D) - IPVA_f(r_B, c_B) - IPVA_f(r_C, c_C) + IPVA_f(r_A, c_A)$. In the example of FIG. 4, the integral pixel values that correspond to points A, B, C, and D are contained in elements 416-1-1, 416-1-4, 416-4-1, and 416-4-4 respectively, have i values of 3, 6, 6, and 14, respectively, and have j values of 0, 10, 9, and 37, respectively. As such, feature detection sum $FDS_I$ corresponding to detection region 403 in pixel arrangement 402 may be calculated according to the equation $FDS_I = 14 - 6 - 6 + 3 = 5$, and feature detection sum $FDS_J$ may be calculated according to the equation $FDS_J = 37 - 10 - 9 + 0 = 18$. The embodiments are not limited to these examples.

In some embodiments, in performing feature detection according to FIGS. 1-4, it may be desirable to perform multiple feature detection iterations where, for each iteration, the size of the pixel arrangement relative to the size of the detection window is reduced. In various embodiments, repeatedly adjusting the size of pixel arrangement relative to the detection window may facilitate the detection of features with a larger range of sizes.

Figure 5:
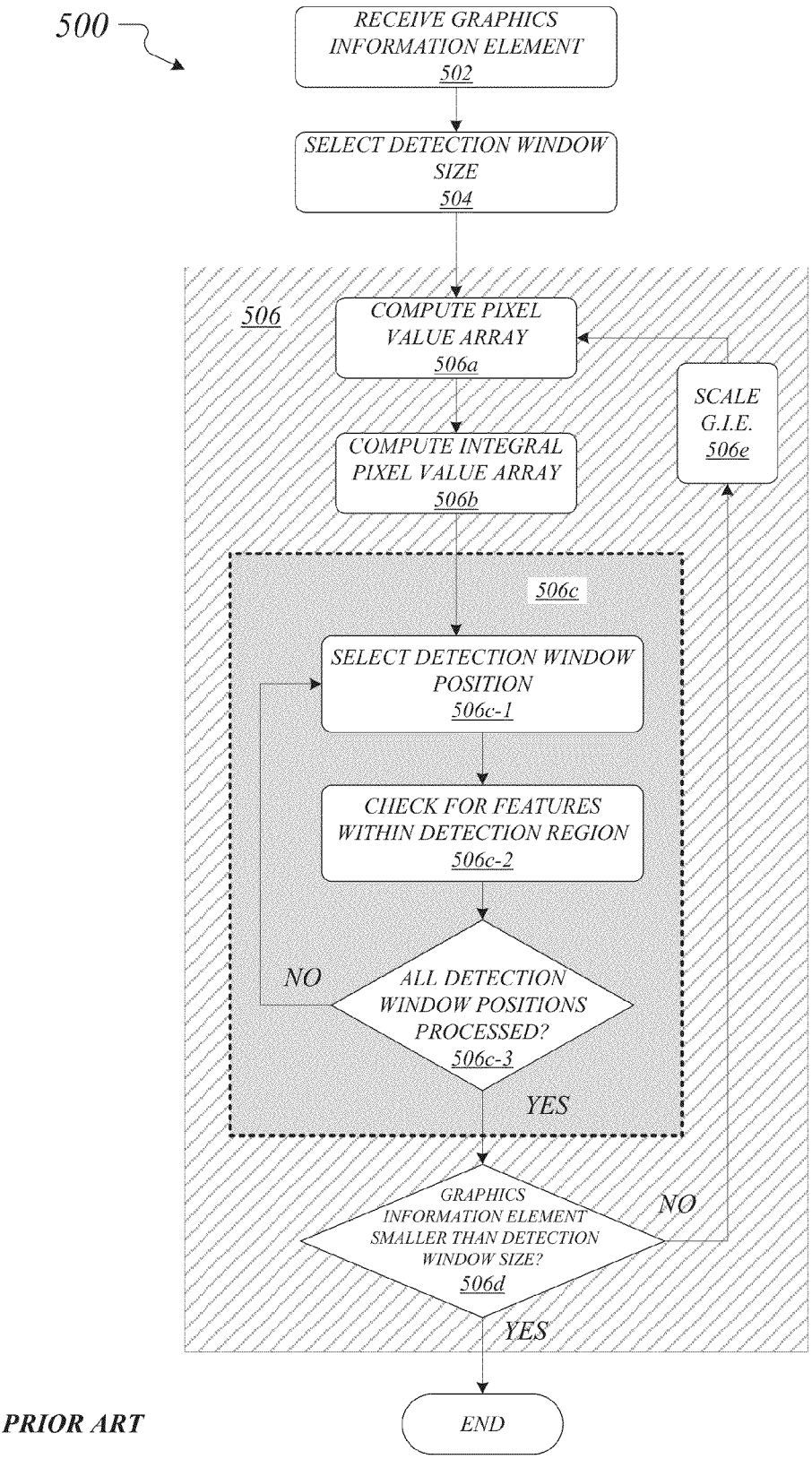
FIG. 5 illustrates one example of a conventional feature detection process.

FIG. 5 illustrates one example of a conventional feature detection process 500 in which a size of a pixel arrangement relative to a size of a detection window is repeatedly reduced. As shown in FIG. 5, a graphics information element may be received at 502. At 504, a detection window size may be selected. At 506, an iterative scaling process may begin. Within that iterative scaling process 506, at 506*a*, a pixel value array may be computed based on the graphics information element. At 506*b*, an integral pixel value array may be computed based on the pixel value array. At 506*c*, an iterative detection window positioning process may begin within iterative scaling process 506. At 506*c*-1 within iterative detection window positioning process 506*c*, a detection window position may be selected. At 506*c*-2, a check may be performed for features within the detection region defined by the selected detection window position. Performing this check may involve calculating one or more feature detection sums based on one or more integral pixel values in the integral pixel value array. At 506*c*-3, it may be determined whether all detection window positions have been processed. If it is determined that all detection window positions have not been processed, flow may return to 506*c*-1, where a new detection window position may be selected. If it is determined that all detection window positions have been processed, iterative detection window positioning process 506*c* may end, and flow may pass to 506*d*.

At 506*d*, it may be determined whether the dimensions of the graphics information element are smaller than the detection window size. For example, if the detection window includes a two dimensional detection window with a size of 20 pixels by 20 pixels, it may be determined whether the graphics information element is smaller than 20 pixels by 20 pixels. If it is determined that the graphics information element is smaller than the detection window size, iterative scaling process 506 may end, and feature detection process 500 may also end. If it is determined that the graphics information element is not smaller than the detection window size, flow may pass to 506*e*. At 506*e*, the graphics information element may be scaled. This scaling may involve reducing the resolution of the graphics information element—and thus the size of the pixel arrangement corresponding to the graphics information element. In an example, scaling the graphics information element may involve reducing a horizontal resolution of the graphics information element by 10% and reducing a vertical resolution of the graphics information element by 10%. Flow may then pass again to 506*a*, where the pixel value array may be recalculated based on the scaled graphics information element.

Rescaling a graphics information element upon which featured detection is being performed—such as according to operation 506*e* in FIG. 5—can be computationally intensive. As a result, the use of conventional feature detection processes such as that illustrated in FIG. 5 may consume substantial processor capacity, exhibit significant latency, and/or reduce system performance. Accordingly, a feature detection process that does not require rescaling of the graphics information element may be advantageous.

Figure 6:
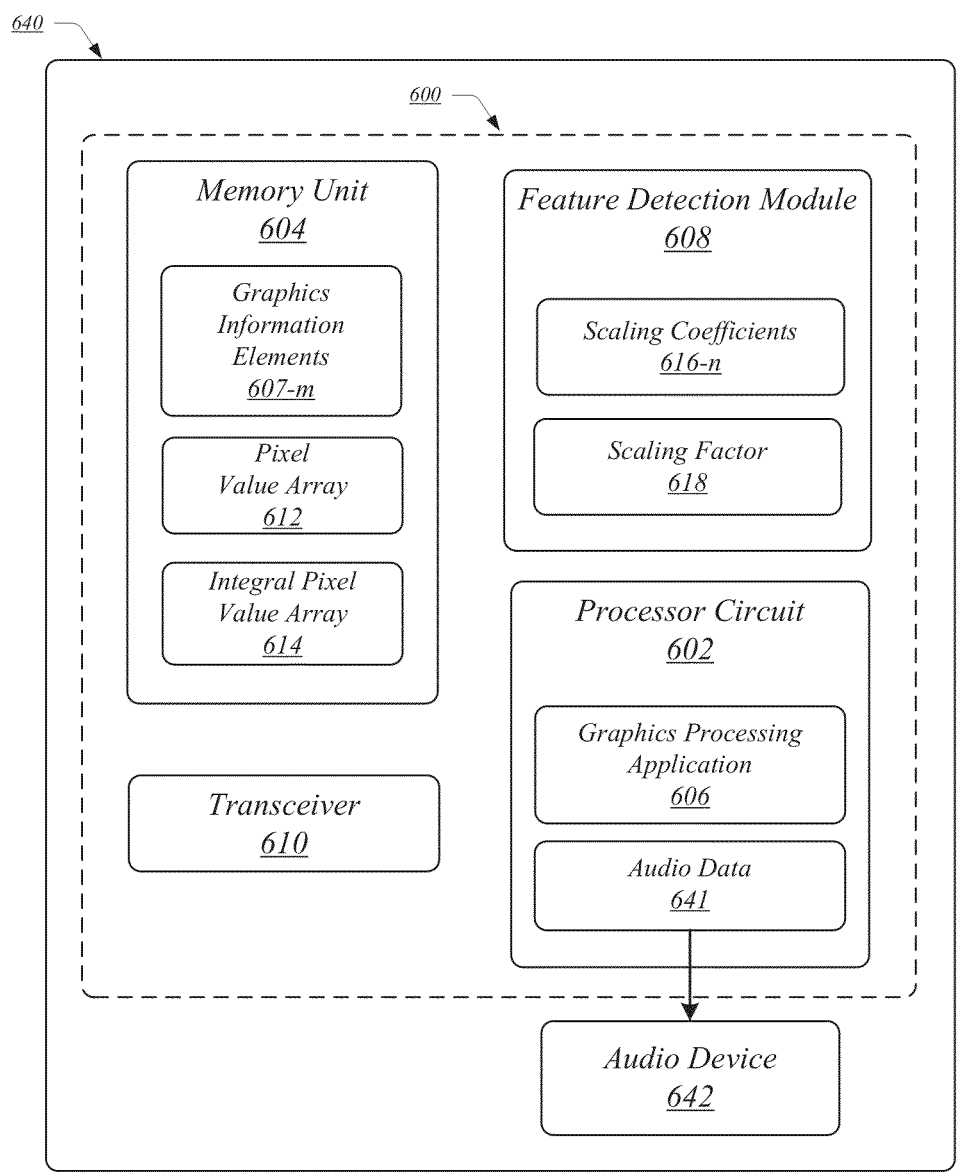
FIG. 6 illustrates one embodiment of a device and one embodiment of a first system.

FIG. 6 illustrates a block diagram of a device 600 for improved feature detection. As shown in FIG. 6, device 600 includes multiple elements including a processor circuit 602, a memory unit 604, a feature detection module 608, and a transceiver 610. The embodiments, however, are not limited to the type, number, or arrangement of elements shown in this figure.

In some embodiments, device 600 may include processor circuit 602. Processor circuit 602 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 602 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 602 may be implemented as a general purpose processor, such as a processor made by Intel® Corporation, Santa Clara, Calif. The embodiments are not limited in this context.

In various embodiments, device 600 may include or be arranged to communicatively couple with a memory unit 604. Memory unit 604 may be implemented using any machine-readable or computer-readable media capable of storing data, including both volatile and non-volatile memory. For example, memory unit 604 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is included within device 600 in FIG. 6, memory unit 604 may be external to device 600 in some embodiments. The embodiments are not limited in this context.

In some embodiments, processor circuit 602 may be operable to execute a graphics processing application 606. Graphics processing application 606 may constitute any application featuring graphics processing capabilities. For example, graphics processing application 606 may be a photo editing program, a productivity application, a multimedia messaging service (MMS) application, a social networking application, or a web browsing application in various embodiments. The embodiments are not limited to these examples.

In various embodiments, device 600 may include a feature detection module 608 arranged to execute feature detection logic, instructions, operations, and/or functions on one or more images, video frames, diagrams, pictures, patterns, icons, or other graphics information elements. In some such embodiments, feature detection module 608 may constitute one or more chips or integrated circuits. In other such embodiments, feature detection module 608 may constitute feature detection logic, instructions, operations, and/or functions implemented in software and executed by processor circuit 602 and/or graphics processing application 606. In various embodiments, feature detection module 608 may be a component of graphics processing application 606, and may be executed in conjunction with execution of graphics processing application 606. In other embodiments, feature detection module 608 may constitute software logic, instructions, operations, and/or functions that are external to graphics processing application 606 and are executable independently thereof. The embodiments are not limited in this respect.

In some embodiments, device 600 may include a transceiver 610. Transceiver 610 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 610 may operate in accordance with one or more applicable standards in any version. The embodiments are not limited in this context.

FIG. 6 may also illustrate a block diagram of a system 640 in various embodiments. System 640 may include any of the aforementioned elements of device 600. System 640 may further include an audio device 642 in some embodiments. Audio device 642 may include any device capable of generating tones, music, speech, speech utterances, sound effects, background noise, or other sounds based on received audio data. Examples of audio device 642 may include a speaker, a multi-speaker system, a home entertainment system, a television, a consumer appliance, a computer system, a mobile device, and a portable electronic media device, among other examples. The embodiments are not limited in this context.

In various embodiments, audio device 642 may be arranged to generate tones, music, speech, speech utterances, sound effects, background noise, or other sounds based on audio data 641 received from device 600. In some embodiments, audio data 641 may be generated by processor circuit 602 in execution of graphics processing application 606, and/or in execution of one or more other applications. The embodiments are not limited in this context.

In general operation, device 600 and/or system 640 may be operative to perform feature detection on one or more graphics information elements 607-$m$. More particularly, device 600 and/or system 640 may be operative to perform feature detection without requiring that the graphics information elements 607-$m$ be iteratively rescaled during the feature detection process, in contrast to conventional systems.

In various embodiments, feature detection module 608 may be operative, during each scaling iteration, to compute an integral pixel value array 614 based on a pixel value array 612 and on one or more scaling coefficients 616-$n$, such that for each scaling iteration, the computed integral pixel value array 614 includes the same values as it would if a graphics information element 607-$m$ corresponding to the pixel value array were first rescaled and the integral pixel value array 614 calculated based on the rescaled graphics information element. By iteratively computing integral pixel value array 614 based on pixel value array 612 and on scaling coefficient(s) 616-$n$ rather than by rescaling graphics information element 607-$m$, feature detection module 608 may reduce processor load and latency, and increase system performance. The embodiments are not limited to these examples.

In some embodiments, scaling coefficients 616-$n$ may include a distinct scaling coefficient for each coordinate dimension of the integral pixel value array 614 to be processed. For example, in an embodiment in which integral pixel value array 614 contains a vertical coordinate dimension r and a horizontal coordinate dimension c, scaling coefficients 616-$n$ may include a vertical scaling coefficient 616-1 corresponding to the vertical coordinate dimension r and may include a horizontal scaling coefficient 616-2 corresponding to the horizontal coordinate dimension c. In other embodiments, there may be a single scaling coefficient that is used for multiple coordinate dimensions. For example, in an embodiment in which integral pixel value array 614 contains a vertical coordinate dimension r and a horizontal coordinate dimension c, a single scaling coefficient 616-1 may be used as both a vertical scaling coefficient corresponding to the vertical coordinate dimension r and a horizontal scaling coefficient corresponding to the horizontal coordinate dimension c. In yet other embodiments, some scaling coefficients 616-$n$ may correspond to single coordinate dimensions while others correspond to multiple coordinate dimensions. The embodiments are not limited in this context.

In various embodiments, feature detection module 608 may be operative during each scaling iteration to compute integral pixel value array 614 by scaling pixel value sums corresponding to pixel value array 612 according to a scaling factor 618. Scaling factor 618 may constitute a value by which the pixel value sums corresponding to pixel value array 612 are multiplied, divided, or otherwise adjusted. For example, if scaling factor 618 constitutes a value by which pixel value sums are to be divided, and has a value of 1.1 during a particular scaling iteration, feature detection module 608 may be operative during that iteration to divide the pixel value sums by 1.1 in order to calculate the integral pixel values in integral pixel value array 614. The embodiments are not limited to this example.

In some embodiments, each scaling coefficient 616-$n$ may constitute a magnitude of scaling that is to be applied with respect to one or more coordinate dimensions, in each particular iteration, to the results of the previous iteration. For example, a scaling coefficient 616-$n$ may have a value of 1.1, and may constitute a scaling divisor to be applied to both an x dimension and a y dimension, during each iteration, to the results of the previous iteration. In various embodiments in which scaling coefficient(s) 616-$n$ constitute magnitudes of scaling to be applied in each particular iteration to the results of the previous iteration, during a particular scaling iteration, scaling factor 618 may constitute a cumulative sum or product of scaling coefficient(s) 616-n over the dimensions being scaled and the number of previous scaling iterations conducted.

For example, if scaling coefficient 616-n has a value of 1.1, and constitutes a scaling divisor to be applied to both an x dimension and a y dimension, feature detection module 608 may calculate, during a first scaling iteration, a value for scaling factor 618 of 1.1×1.1, which is equal to 1.21, and use that scaling factor value of 1.21 as a scaling divisor in the first iteration. In such an example, feature detection module 608 may then calculate, during a second scaling iteration, a value for scaling factor 618 of $1.1^2 \times 1.1^2$, which is equal to 1.4641, and use that scaling factor value of 1.4641 as a scaling divisor in the second iteration. In some embodiments, feature detection module may calculate a scaling factor 618 to be used in a particular scaling iteration based on scaling coefficients 616-n and on the scaling factor 618 used in the previous scaling iteration. For example, rather than calculating, during the second scaling iteration, a value for scaling factor 618 as $1.1^2 \times 1.1^2$, feature detection module 608 may obtain the same result by calculating a value for scaling factor 618 as 1.21× 1.21. The embodiments are not limited to these examples.

In various embodiments, scaling coefficient(s) 616-n may be selected to correspond with the notional scaling of a graphics information element 607-m to which the calculated integral pixel values in integral pixel value array 614 are to correspond. In some such embodiments, scaling coefficient(s) 616-n may be selected in view of a spatial data coherency property exhibited by resized graphics information elements. According to the spatial data coherency property, the sums of pixel values in regions of a pixel value array 612' corresponding to a resized graphics information element 607-m' may be proportional to the sums of pixel values in corresponding regions of a pixel value array 612 corresponding to a graphics information element 607-m that is resized to form resized graphics information element 607-m'. More particularly, such sums of pixel values in regions of pixel value array 612' may be proportional to sums of pixel values in corresponding regions of pixel value array 612 according to the magnitudes by which the dimensions of resized graphics information element 607-m' are reduced in comparison to graphics information element 607-m. For example, if graphics information element 607-m constitutes a pixel arrangement with a width w and a height h and resized graphics information element 607-m' is formed by reducing the resolution of graphics information element 607-m to obtain a pixel arrangement with a width w' and a height h', the spatial data coherency property of graphics information element 607-m may dictate that S'=S×(w'×h')/(w×h), where S is the sum of pixel values in a region of a pixel value array corresponding to graphics information element 607-m, and S' is the sum pixel values in a corresponding region of a pixel value array corresponding to graphics information element 607-m'.

Continuing with this example, in order to calculate integral pixel values for integral pixel value array 614 such that they correspond to notional resized graphics information element 607-m', feature detection module 608 may select one or more scaling coefficients 616-n based on the ratio of w'/w, h'/h, and/or (w'×h')/(w×h). For example, if both the width and the height of resized graphics information element 607-m' are 10% less than the respective width and height of graphics information element 607-m, feature detection module 608 may select a scaling coefficient 616-1 with a value of 100/90 to be applied in the w dimension, and a scaling coefficient 616-2 with a value of 100/90 to be applied in the h dimension. Alternatively, feature detection module may simply select a single scaling coefficient 616-1 with a value of 100/90 to be applied in both the w dimension and the h dimension. The embodiments are not limited to these examples.

As noted above with respect to element 506d in FIG. 5, in conventional systems, an iterative scaling process 506 may continue until the resized graphics information element is smaller than the detection window size. In some embodiments, in order to ensure that a same number of scaling iterations are performed as would be in such a conventional iterative scaling process, feature detection module 608 may be operative, during each scaling iteration, to determine whether all scaling iterations have been processed by calculating a notional resized graphics information element size based on a scaling factor and compare it to the detection window size. In various such embodiments, feature detection module 608 may be operative to determine that all scaling iterations have been processed and to end an iterative scaling process when the notional resized graphics information element size is smaller than the detection window size. The embodiments are not limited in this context.

Figure 7:
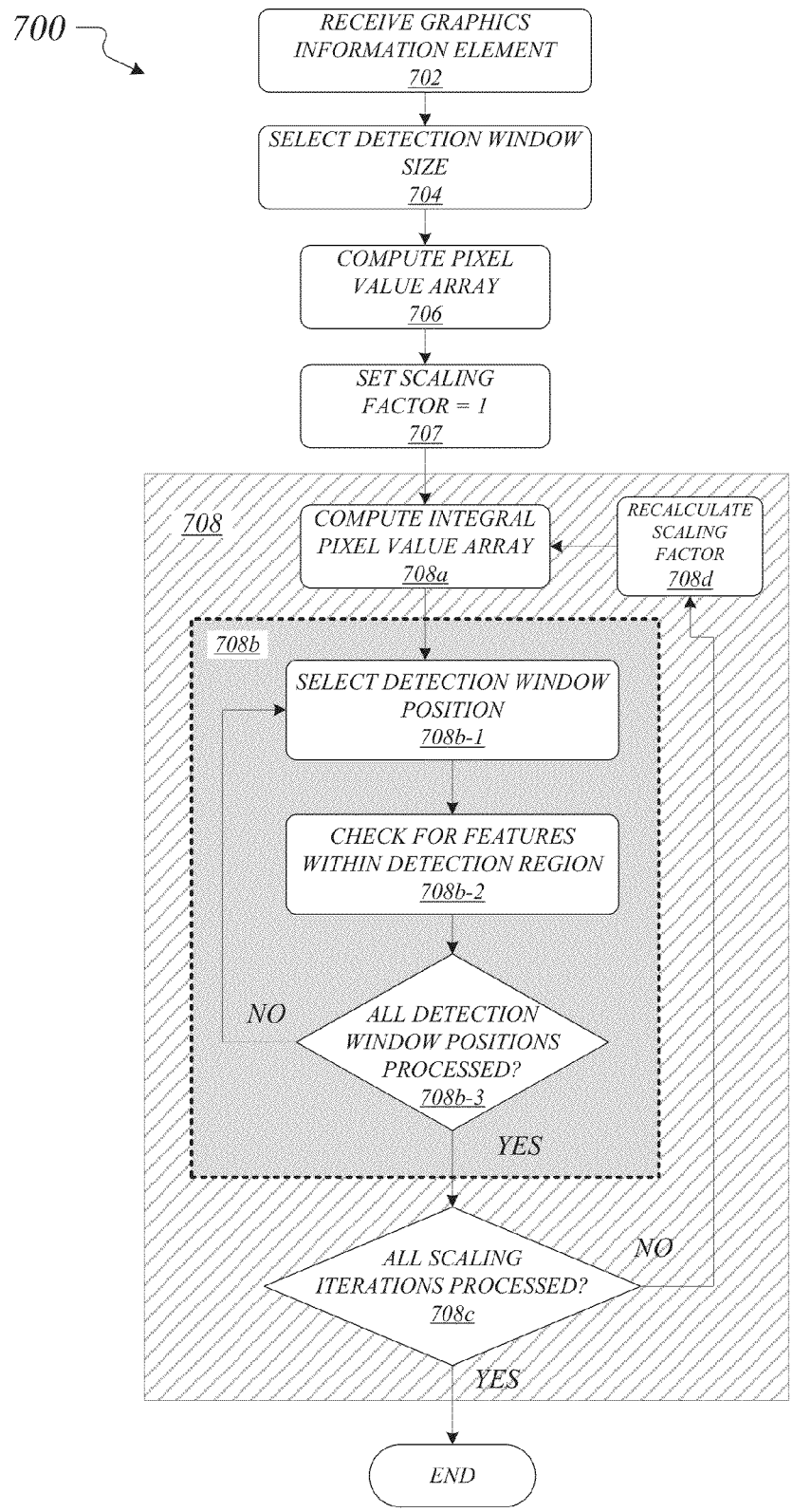
FIG. 7 illustrates one embodiment of a second logic flow.

FIG. 7 illustrates one embodiment of a feature detection process 700 suitable for use in conjunction with various embodiments described herein, such as with device 600 and/or system 640 of FIG. 6. As shown in FIG. 7, a graphics information element may be received at 702. For example, feature detection module 608 of FIG. 6 may receive graphics information element 607-m. At 704, a detection window size may be selected. For example, feature detection module 608 of FIG. 6 may select a detection window size. At 706, a pixel value array may be computed based on the graphics information element. For example, feature detection module 608 of FIG. 6 may compute pixel value array 612 based on graphics information element 607-m. At 707, a scaling factor may be set equal to 1. For example, feature detection module 608 of FIG. 6 may set scaling factor 618 equal to 1. At 708, an iterative scaling process may begin. Within that iterative scaling process 708, at 708a, an integral pixel value array may be computed based on the pixel value array and the scaling factor. For example, feature detection module 608 of FIG. 6 may compute integral pixel value array 614 based on pixel value array 612 and scaling factor 618.

At 708b, an iterative detection window positioning process may begin within iterative scaling process 708. At 708b-1 within iterative detection window positioning process 708b, a detection window position may be selected. For example, feature detection module 608 of FIG. 6 may select a detection window position. At 708b-2, a check may be performed for features within the detection region defined by the selected detection window position. For example, feature detection module 608 of FIG. 6 may perform a check for features within the detection region defined by the selected detection window position. Performing this check may involve calculating one or more feature detection sums based on one or more integral pixel values in the integral pixel value array. For example, feature detection module 608 may perform a check for features by calculating one or more feature detection sums based on integral pixel values in integral pixel value array 614. At 708b-3, it may be determined whether all detection window positions have been processed. For example, feature detection module 608 of FIG. 6 may determine whether all detection window positions have been processed. If it is determined that all detection window positions have not been processed, flow may return to 708b-1, where a new detection window position may be selected. If it is determined that all detection window positions have been processed, iterative detection window positioning process 708b may end, and flow may pass to 708c.

At 708c, it may be determined whether all scaling iterations have been processed. For example, feature detection module 608 of FIG. 6 may use scaling factor 618 to calculate a notional resized graphics information element size and compare this size with the detection window size to determine whether all scaling iterations have been processed. If it is determined that all scaling iterations have been processed, iterative scaling process 708 may end, and feature detection process 700 may also end. If it is determined that all scaling iterations have not been processed, flow may pass to 708d. At 708d, the scaling factor may be recalculated. In some embodiments, the scaling factor may be recalculated based on its current value, on one or more scaling coefficients, and/or on a number of scaling iterations that have been completed. For example, feature detection module 608 of FIG. 6 may recalculate scaling factor 618 based on a current value of scaling factor 618, on one or more scaling coefficients 616-$n$, and/or on a number of scaling iterations that have been completed. Flow may then pass again to 708a, where the integral pixel value array may be recalculated based on the recalculated scaling factor. For example, feature detection module 608 of FIG. 6 may recalculate integral pixel value array 614 based on a recalculated scaling factor 618. The embodiments are not limited to these examples.

Figure 8:
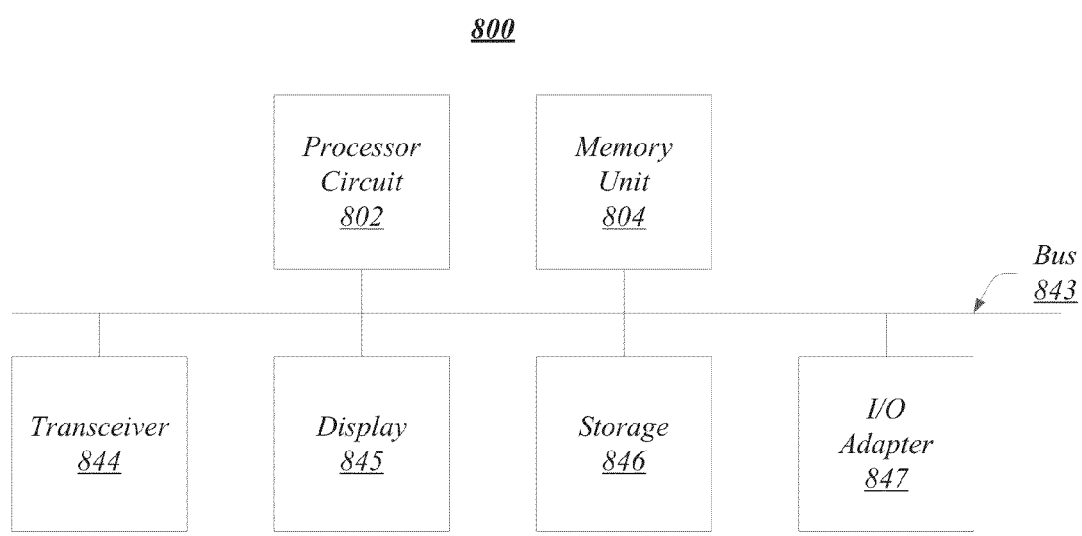
FIG. 8 illustrates one embodiment of a second system.

FIG. 8 illustrates one embodiment of a system 800. In various embodiments, system 800 may be representative of a system or architecture suitable for use with one or more embodiments described herein, such as logic flow 200 of FIG. 2, device 600 and/or system 640 of FIG. 6, and/or logic flow 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor circuit 802. Processor circuit 802 may be implemented using any processor or logic device, and may be the same as or similar to processor circuit 602 of FIG. 6.

In one embodiment, system 800 may include a memory unit 804 to couple to processor circuit 802. Memory unit 804 may be coupled to processor circuit 802 via communications bus 843, or by a dedicated communications bus between processor circuit 802 and memory unit 804, as desired for a given implementation. Memory unit 804 may be implemented using any machine-readable or computer-readable media capable of storing data, including both volatile and non-volatile memory, and may be the same as or similar to memory unit 604 of FIG. 6. In some embodiments, the machine-readable or computer-readable medium may include a non-transitory medium. The embodiments are not limited in this context.

In various embodiments, system 800 may include a transceiver 844. Transceiver 844 may include one or more radios capable of transmitting and receiving signals using various suitable wireless communications techniques, and may be the same as or similar to transceiver 610 of FIG. 6.

In various embodiments, system 800 may include a display 845. Display 845 may constitute any display device capable of displaying information received from processor circuit 802. Examples for display 845 may include a television, a monitor, a projector, and a computer screen. In one embodiment, for example, display 845 may be implemented by a liquid crystal display (LCD), light emitting diode (LED) or other type of suitable visual interface. Display 845 may constitute, for example, a touch-sensitive color display screen. In various implementations, display 845 may include one or more thin-film transistors (TFT) LCD including embedded transistors. In various embodiments, display 845 may be arranged to display a graphical user interface operable to directly or indirectly control a graphics processing application, such as graphics processing application 606 in FIG. 6, for example. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

Figure 9:
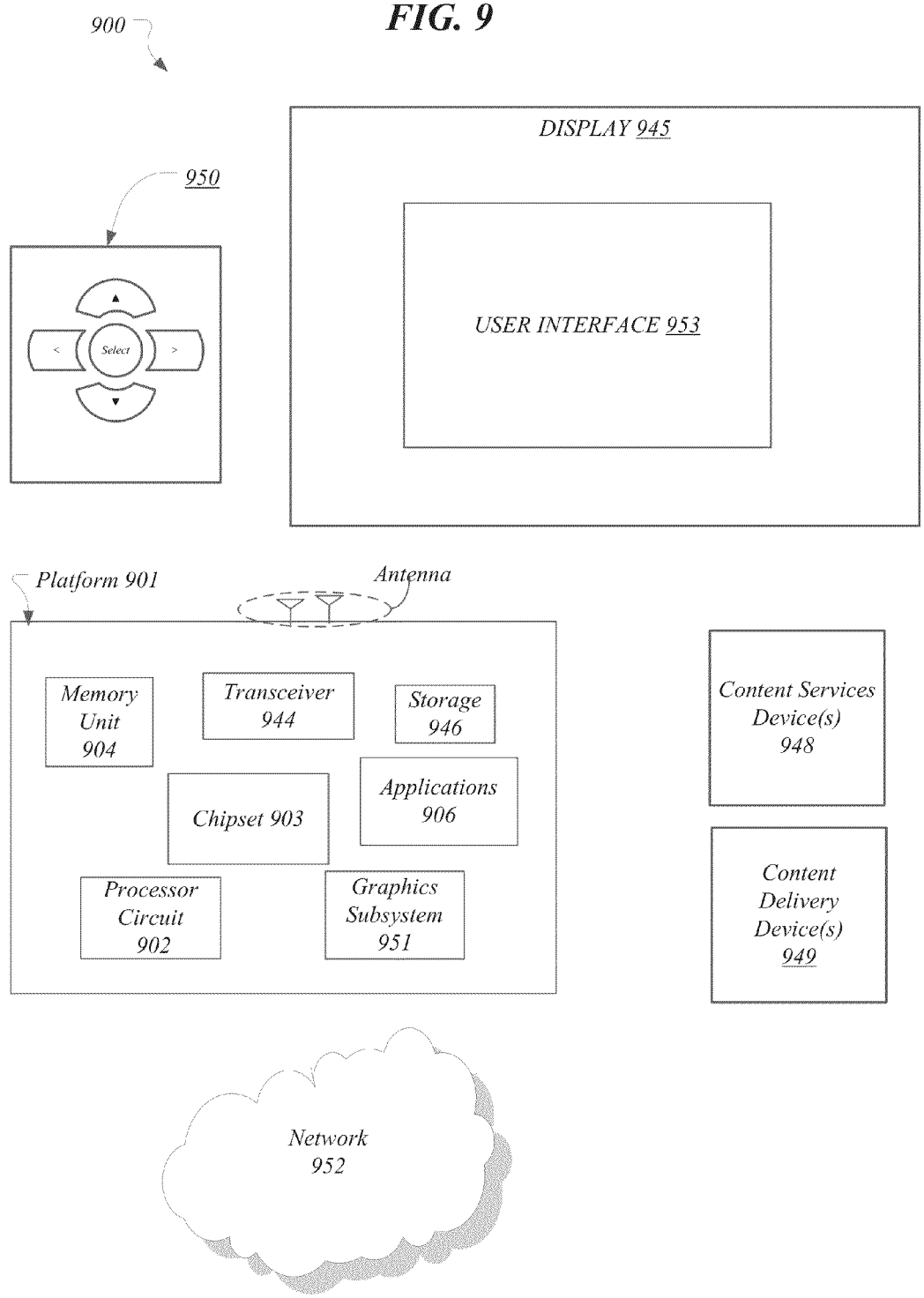
FIG. 9 illustrates one embodiment of a third system.

FIG. 9 illustrates an embodiment of a system 900. In various embodiments, system 900 may be representative of a system or architecture suitable for use with one or more embodiments described herein, such as logic flow 200 of FIG. 2, device 600 and/or system 640 of FIG. 6, logic flow 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor circuit 902, chipset 903, memory unit 904, transceiver 944, storage 946, applications 951, and/or graphics subsystem 952. Chipset 903 may provide intercommunication among processor circuit 902, memory unit 904, transceiver 944, storage 946, applications 951, and/or graphics subsystem 952. For example, chipset 903 may include a storage adapter (not depicted) capable of providing intercommunication with storage 946.

Processor circuit 902 may be implemented using any processor or logic device, and may be the same as or similar to processor circuit 802 in FIG. 8.

Memory unit 904 may be implemented using any machine-readable or computer-readable media capable of storing data, and may be the same as or similar to memory unit 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor circuit 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the invention.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
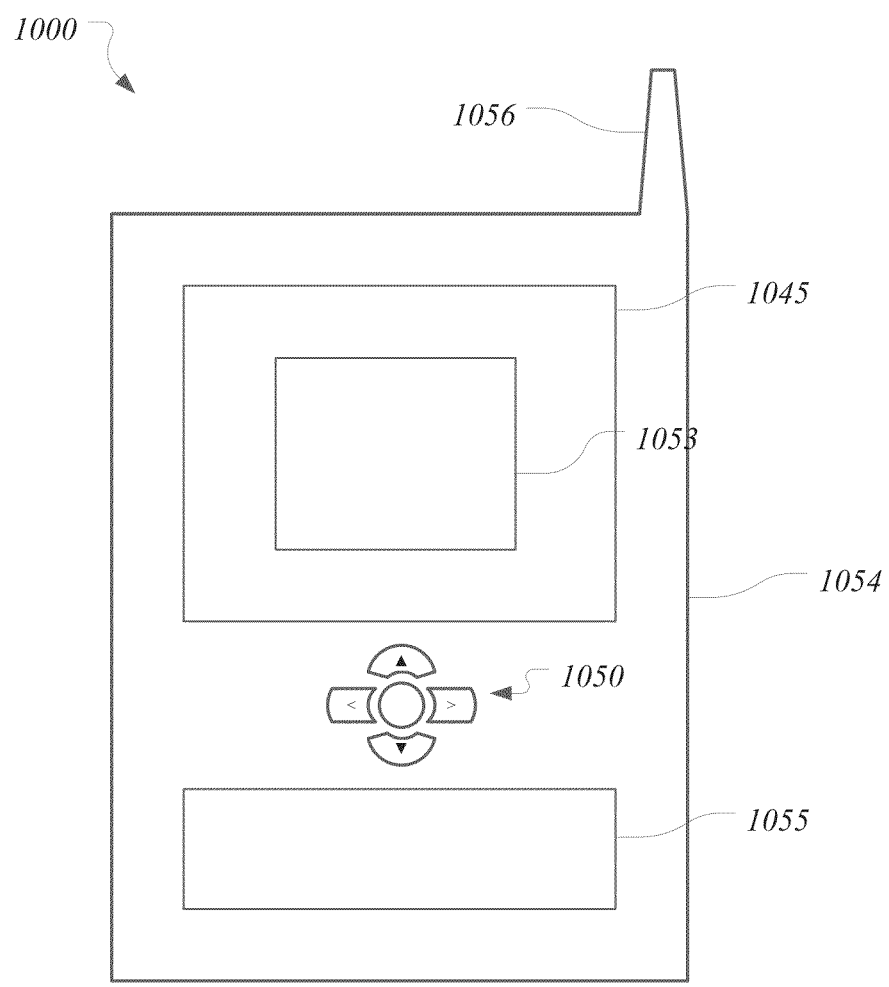
FIG. 10 illustrates one embodiment of a second device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

A computer-implemented method may comprise performing, by a processor circuit, a first feature detection iteration for a graphics information element using an integral pixel value array, determining a scaling factor, recalculating the integral pixel value array based on the scaling factor, and performing a second feature detection iteration for the graphics information element using the recalculated integral pixel value array.

Such a computer-implemented method may comprise computing the integral pixel value array based on a pixel value array corresponding to the graphics information element.

According to such a computer-implemented method, the integral pixel value array may comprise integral pixel values, and the integral pixel values may comprise sums of pixel values in corresponding regions of the pixel value array.

According to such a computer-implemented method, the pixel value array may comprise multi-dimensional pixel values.

According to such a computer-implemented method, the first feature detection iteration may comprise calculating a first feature detection sum based on integral pixel values in the integral pixel value array that correspond to a detection window.

According to such a computer-implemented method, the second feature detection iteration may comprise calculating a second feature detection sum based on integral pixel values in the recalculated integral pixel value array that correspond to the detection window.

Such a computer-implemented method may comprise detecting a feature in the detection window based on one or both of the first feature detection sum and the second feature detection sum.

Such a computer-implemented method may comprise determining a second scaling factor, recalculating the recalculated integral pixel value array based on the second scaling factor to obtain a second recalculated integral pixel value array, and performing a third feature detection iteration for the graphics information element using the second recalculated integral pixel value array.

An apparatus may comprise a processor circuit, a memory unit, and a feature detection module operative on the processor circuit to perform a first feature detection iteration for a graphics information element using an integral pixel value array, determine a scaling factor, recalculate the integral pixel value array based on the scaling factor, and perform a second feature detection iteration for the graphics information element using the recalculated integral pixel value array.

With respect to such an apparatus, the feature detection module may be operative on the processor circuit to compute the integral pixel value array based on a pixel value array corresponding to the graphics information element.

With respect to such an apparatus, the integral pixel value array may comprise integral pixel values, and the integral pixel values may comprise sums of pixel values in corresponding regions of the pixel value array.

With respect to such an apparatus, the pixel value array may comprise multi-dimensional pixel values.

With respect to such an apparatus, the first feature detection iteration may comprise calculating a first feature detection sum based on integral pixel values in the integral pixel value array that correspond to a detection window.

With respect to such an apparatus, the second feature detection iteration may comprise calculating a second feature detection sum based on integral pixel values in the recalculated integral pixel value array that correspond to the detection window.

With respect to such an apparatus, the feature detection module may be operative on the processor circuit to detect a feature in the detection window based on one or both of the first feature detection sum and the second feature detection sum.

With respect to such an apparatus, the feature detection module may be operative on the processor circuit to determine a second scaling factor, recalculate the recalculated integral pixel value array based on the second scaling factor to obtain a second recalculated integral pixel value array, and perform a third feature detection iteration for the graphics information element using the second recalculated integral pixel value array.

At least one computer-readable medium may comprise a plurality of instructions that, in response to being executed on a computing device, cause the computing device to perform a first feature detection iteration for a graphics information element using an integral pixel value array, determine a scaling factor, recalculate the integral pixel value array based on the scaling factor, and perform a second feature detection iteration for the graphics information element using the recalculated integral pixel value array.

Such at least one computer-readable medium may comprise instructions that, in response to being executed on the computing device, cause the computing device to compute the integral pixel value array based on a pixel value array corresponding to the graphics information element.

With respect to such at least one computer-readable medium, the integral pixel value array may comprise integral pixel values, and the integral pixel values may comprise sums of pixel values in corresponding regions of the pixel value array.

With respect to such at least one computer-readable medium, the pixel value array may comprise multi-dimensional pixel values.

With respect to such at least one computer-readable medium, the first feature detection iteration may comprise calculating a first feature detection sum based on integral pixel values in the integral pixel value array that correspond to a detection window.

With respect to such at least one computer-readable medium, the second feature detection iteration may comprise calculating a second feature detection sum based on integral pixel values in the recalculated integral pixel value array that correspond to the detection window.

Such at least one computer-readable medium may comprise instructions that, in response to being executed on the computing device, cause the computing device to detect a feature in the detection window based on one or both of the first feature detection sum and the second feature detection sum.

Such at least one computer-readable medium may comprise instructions that, in response to being executed on the computing device, cause the computing device to determine a second scaling factor, recalculate the recalculated integral pixel value array based on the second scaling factor to obtain a second recalculated integral pixel value array, and perform a third feature detection iteration for the graphics information element using the second recalculated integral pixel value array.

A system may comprise a processor circuit, a memory unit, an audio device, and a feature detection module operative on the processor circuit to perform a first feature detection iteration for a graphics information element using an integral pixel value array, determine a scaling factor, recalculate the integral pixel value array based on the scaling factor, and perform a second feature detection iteration for the graphics information element using the recalculated integral pixel value array.

With respect to such a system, the feature detection module may be operative on the processor circuit to compute the integral pixel value array based on a pixel value array corresponding to the graphics information element, the integral pixel value array may comprise integral pixel values, and the integral pixel values may comprise sums of pixel values in corresponding regions of the pixel value array.

With respect to such a system, the pixel value array may comprise multi-dimensional pixel values.

With respect to such a system, the first feature detection iteration may comprise calculating a first feature detection sum based on integral pixel values in the integral pixel value array that correspond to a detection window, and the second feature detection iteration may comprise calculating a second feature detection sum based on integral pixel values in the recalculated integral pixel value array that correspond to the detection window.

With respect to such a system, the feature detection module may be operative on the processor circuit to detect a feature in the detection window based on one or both of the first feature detection sum and the second feature detection sum.

With respect to such a system, the feature detection module may be operative on the processor circuit to determine a second scaling factor, recalculate the recalculated integral pixel value array based on the second scaling factor to obtain a second recalculated integral pixel value array, and perform a third feature detection iteration for the graphics information element using the second recalculated integral pixel value array.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
    performing, by a processor circuit, a first feature detection iteration for a graphics information element using a first integral pixel value array calculated from a pixel value array that corresponds to the graphics information element;
    determining a scaling factor;
    calculating a second integral pixel value array from the first integral pixel value array by:
        dividing integral pixel values of the first integral pixel value array by the scaling factor; or
        multiplying the integral pixel values of the first integral pixel value array by the scaling factor;
    performing a second feature detection iteration for the graphics information element using the second integral pixel value array; and
    transmitting an output derived from the second integral pixel value array to a display or by a transceiver coupled to the processor circuit onto a network.

2. The computer-implemented method of claim 1, the integral pixel values of the first integral pixel value array comprising sums of pixel values in corresponding regions of the pixel value array.

3. The computer-implemented method of claim 2, the pixel value array comprising multi-dimensional pixel values.

4. The computer-implemented method of claim 1, the first feature detection iteration comprising calculating a first feature detection sum based on ones of the integral pixel values of the first integral pixel value array that correspond to a detection window.

5. The computer-implemented method of claim 4, the second feature detection iteration comprising calculating a second feature detection sum based on integral pixel values of the second integral pixel value array that correspond to the detection window.

6. The computer-implemented method of claim 5, comprising detecting a feature in the detection window based on one or both of the first feature detection sum and the second feature detection sum.

7. The computer-implemented method of claim 1, comprising:
   determining another scaling factor;
   calculating a third integral pixel value array based on applying the other scaling factor to integral pixel values of the second integral pixel value array; and
   performing a third feature detection iteration for the graphics information element using the third integral pixel value array.

8. An apparatus, comprising:
   a processor circuit;
   a memory unit; and
   a feature detection module operative on the processor circuit to:
      perform a first feature detection iteration for a graphics information element using a first integral pixel value array calculated from a pixel value array that corresponds to the graphics information element;
      determine a scaling factor;
      calculate a second integral pixel value array from the first integral pixel value array by:
         dividing integral pixel values of the first integral pixel value array by the scaling factor; or
         multiplying the integral pixel values of the first integral pixel value array by the scaling factor;
      perform a second feature detection iteration for the graphics information element using the second integral pixel value array; and
   a transceiver to transmit onto a network or a display to present an output derived from the second integral pixel array.

9. The apparatus of claim 8, the integral pixel values of the first integral pixel value array comprising sums of pixel values in corresponding regions of the pixel value array.

10. The apparatus of claim 9, the pixel value array comprising multi-dimensional pixel values.

11. The apparatus of claim 8, the first feature detection iteration comprising calculating a first feature detection sum based on ones of the integral pixel values of the first integral pixel value array that correspond to a detection window.

12. The apparatus of claim 11, the second feature detection iteration comprising calculating a second feature detection sum based on integral pixel values of the second integral pixel value array that correspond to the detection window.

13. The apparatus of claim 12, the feature detection module operative on the processor circuit to detect a feature in the detection window based on one or both of the first feature detection sum and the second feature detection sum.

14. The apparatus of claim 8, the feature detection module operative on the processor circuit to:
   determine another scaling factor;
   calculate a third integral pixel value array based on applying the other scaling factor to integral pixel values of the second integral pixel value array; and
   perform a third feature detection iteration for the graphics information element using the third integral pixel value array.

15. At least one non-transitory machine-readable medium comprising a plurality of instructions that, in response to being executed on a computing device, cause the computing device to:
   perform a first feature detection iteration for a graphics information element using a first integral pixel value array calculated from a pixel value array that corresponds to the graphics information element;
   determine a scaling factor;
   calculate a second integral pixel value array from the first integral pixel value array by:
      dividing integral pixel values of the first integral pixel value array by the scaling factor; or
      multiplying the integral pixel values of the first integral pixel value array by the scaling factor;
   perform a second feature detection iteration for the graphics information element using the second integral pixel value array; and
   transmit an output derived from the second integral pixel value array to a display or onto a network.

16. The at least one machine-readable medium of claim 15, the integral pixel values of the first integral pixel value array comprising sums of pixel values in corresponding regions of the pixel value array.

17. The at least one machine-readable medium of claim 16, the pixel value array comprising multi-dimensional pixel values.

18. The at least one machine-readable medium of claim 15, the first feature detection iteration comprising calculating a first feature detection sum based on ones of the integral pixel values of the first integral pixel value array that correspond to a detection window.

19. The at least one machine-readable medium of claim 18, the second feature detection iteration comprising calculating a second feature detection sum based on integral pixel values of the second integral pixel value array that correspond to the detection window.

20. The at least one machine-readable medium of claim 19, comprising instructions that, in response to being executed on the computing device, cause the computing device to detect a feature in the detection window based on one or both of the first feature detection sum and the second feature detection sum.

21. The at least one machine-readable medium of claim 15, comprising instructions that, in response to being executed on the computing device, cause the computing device to:
   determine another scaling factor;
   calculate a third integral pixel value array based on applying the other scaling factor to integral pixel values of the second integral pixel value array; and
   perform a third feature detection iteration for the graphics information element using the third integral pixel value array.

22. A system, comprising:
a processor circuit;
a memory unit;
an audio device; and
a feature detection module operative on the processor circuit to:
perform a first feature detection iteration for a graphics information element using a first integral pixel value array calculated from a pixel value array that corresponds to the graphics information element;
determine a scaling factor;
calculate a second integral pixel value array from the first integral pixel value array by:
dividing integral pixel values of the first integral pixel value array by the scaling factor; or
multiplying the integral pixel values of the first integral pixel value array by the scaling factor;
perform a second feature detection iteration for the graphics information element using the second integral pixel value array; and
a transceiver to transmit onto a network or a display to present an output derived from the second integral pixel array.

23. The system of claim 22, the integral pixel values of the first integral pixel value array comprising sums of pixel values in corresponding regions of the pixel value array.

24. The system of claim 23, the pixel value array comprising multi-dimensional pixel values.

25. The system of claim 22, the first feature detection iteration comprising calculating a first feature detection sum based on ones of the integral pixel values of the first integral pixel value array that correspond to a detection window, the second feature detection iteration comprising calculating a second feature detection sum based on integral pixel values of the second integral pixel value array that correspond to the detection window.

26. The system of claim 25, the feature detection module operative on the processor circuit to detect a feature in the detection window based on one or both of the first feature detection sum and the second feature detection sum.

27. The system of claim 22, the feature detection module operative on the processor circuit to:
determine another scaling factor;
calculate a third integral pixel value array based on applying the other scaling factor to integral pixel values of the second integral pixel value array; and
perform a third feature detection iteration for the graphics information element using the third integral pixel value array.

* * * * *